UNITED STATES PATENT OFFICE.

LUDWIG ROSENSTEIN, OF SAN FRANCISCO, AND ERNEST H. SIMONDS, OF OAKLAND, CALIFORNIA.

PROCESS FOR EXTRACTING TRIOXID OF TUNGSTEN FROM ITS ORES.

1,244,082.      Specification of Letters Patent.      Patented Oct. 23, 1917.

No Drawing.      Application filed September 27, 1916. Serial No. 122,516.

*To all whom it may concern:*

Be it known that we, the undersigned, LUDWIG ROSENSTEIN, a citizen of the United States, and a resident of the city and county of San Francisco, State of California, and ERNEST H. SIMONDS, of the city of Oakland, county of Alameda, State of California, have made a new and useful invention, to wit: Process for Extracting Trioxid of Tungsten From Its Ores; and we do hereby declare the following to be a full, clear, concise, and exact description thereof.

Tungsten is usually found in nature combined with calcium, iron or manganese as tungstates.

The object of our invention is to separate the trioxid of tungsten from the other constituents and produce what is commercially called "tungstic acid", which consists of the trioxid of tungsten. We shall describe the process as particularly applied to the recovery of this substance from calcium tungstate, commonly called "Scheelite", it being understood that it may likewise be applied to other tungstates found in nature.

The ore containing the calcium tungstate is first reduced to a powder and mixed with approximately twice its weight of water. Assuming that the ore being operated on contains about three per cent. of calcium tungstate, we add to the mixture sodium carbonate and sodium hydrate in sufficient quantities to make the combined solution contain about three per cent. of each. When the ores contain a greater per cent. of calcium tungstate the proportions of sodium carbonate and sodium hydrate must be increased accordingly. A sufficient amount of common salt may be added to coagulate whatever colloidal material may be present, if any, and thus render the subsequent filtration easier. In practice we recommend approximately five per cent. of salt. This mixture of materials is then boiled for approximately six hours, though this boiling may be continued longer if the extraction proves slow. By the reactions occurring during this boiling process, sodium tungstate and calcium carbonate are formed, while the sodium hydrate acts to aid the dissolution. The sodium hydrate is not absolutely essential, and, therefore may be omitted. But it acts to shorten the digestion, thereby reducing cost of production, and is, therefore, ordinarily desirable. It is especially desirable when operating on tailings or lean ores, which require extended digestion; but when operating on concentrates or rich ores, which do not require extended digestion, it need not be used. The sodium tungstate is more soluble than the calcium carbonate, and, consequently, the calcium carbonate is precipitated as an inert mass, which is removed in any appropriate manner, leaving a liquid mixture containing in solution sodium tungstate, sodium hydrate, and possibly an excess of sodium carbonate left over, together with salt. From this resultant mixture the tungstate is recovered in the following manner: Slaked lime is added in sufficient quantity to react on the excess of sodium carbonate which was left over by the first operation, thereby producing calcium carbonate which is precipitated as an inert mass, and is removed in any convenient manner. The supernatant liquid mixture is then mixed with barium chlorid in quantity chemically equivalent to the amount of sodium tungstate present, or we may use any other barium compound sufficiently soluble to react with sodium tungstate in solution, and this mixture is boiled approximately twenty minutes. This results in the formation of barium tungstate and sodium chlorid, if the barium compound used be in the form of barium chlorid. If a different form of barium compound be used, then the result will be barium tungstate and some other form of sodium compound. The barium tungstate is then removed into another vessel and treated with hydrochloric acid, which results in the formation of barium chlorid, water, and trioxid of tungsten, commonly called tungstic acid. This trioxid of tungsten is then removed and is ready for use. It may appear chemically possible to effect precipitation of trioxid of tungsten from the sodium tungstate solution by the direct application of hydrochloric acid to such solution without the intervening step of using a barium compound: but we have found that such direct precipitation is impracticable for commercial use, because in practice there is always an excess of alkali present and it would be necessary to use an amount of acid sufficient to neutralize this entire excess, which would necessitate an acid consumption so great as to be unprofitable commercially; and furthermore, the trioxid of tungsten would be produced in a slimy and partially colloidal condition unsuited to filtration on a large scale and necessitating some further process of purification. But by our process an excess of acid is not required, thereby insuring cheap production, and the trioxid of tungsten is produced in a pure state ready for use without necessitating a further process of purification.

Instead of treating the barium tungstate with hydrochloric acid, as above specified, an alternative is to treat it with an aqueous solution of ammonia and carbon dioxid, in which case the mixture is placed in a closed vessel and heated to such temperature as will cause decomposition, resulting in the formation of barium carbonate and ammonium tungstate. The barium carbonate being in a solid form is removed in any suitable manner, leaving ammonium tungstate in solution. This solution of ammonium tungstate is then distilled by heat whereby the ammonia is driven off and the solid trioxid of tungsten left.

The recovery of trioxid of tungsten from the barium tungstate may be effected in other ways than those described.

Although we have described our process particularly with reference to calcium tungstate ores, commonly styled "Scheelite", it is to be understood that the process is equally applicable to other tungstates. In applying the process to other tungstates the production of trioxid of tungsten will be the ultimate result, though certain reactions will take place resulting in byproducts different from those occurring when operating on calcium tungstate. Thus, when treating ferrous tungstate, commonly called "Ferberite", iron carbonate, instead of calcium carbonate, will be produced by the first step in the process; and when treating manganous tungstate, commonly called "Huberite," manganous carbonate will be produced. These byproducts do not affect the process and are negligible factors.

Having now described one convenient method of practising our invention, what we claim and desire to secure by Letters Patent is:

1. The process of recovering trioxid of tungsten from its ores, which consists in reducing the ores to a powder and mixing with water, then adding sodium carbonate and boiling the mixture, whereby sodium tungstate is formed, then treating the sodium tungstate with a soluble barium compound, whereby barium tungstate is formed, and finally recovering the trioxid of tungsten from the said barium tungstate.

2. The process of recovering trioxid of tungsten from its ores which consists in reducing the ores to a powder and mixing with water, then adding sodium carbonate and boiling the mixture whereby sodium tungstate is formed, then treating the sodium tungstate with a soluble barium compound whereby barium tungstate is formed, and finally treating the barium tungstate with hydrochloric acid whereby trioxid of tungsten is formed.

3. The process of recovering trioxid of tungsten from its ores which consists in reducing the ores to a powder and mixing with water, then adding sodium carbonate and sodium hydrate and boiling the mixture, whereby sodium tungstate is formed then treating the sodium tungstate with a soluble barium compound, whereby barium tungstate is formed, and finally treating the barium tungstate with hydrochloric acid whereby trioxid of tungsten is formed.

4. The process of recovering trioxid of tungsten from its ores which consists in reducing the ores to a powder and mixing with water, then adding sodium carbonate, sodium hydrate, and salt, and boiling the mixture, whereby sodium tungstate is formed, then treating the sodium tungstate with a soluble barium compound, whereby barium tungstate is formed, and finally treating the barium tungstate with hydrochloric acid, whereby trioxid of tungsten is formed.

5. The process of recovering trioxid of tungsten from its ores which consists in reducing the ores to a powder and mixing with water, then adding sodium carbonate and sodium hydrate and boiling the mixture, whereby sodium tungstate is formed, then filtering the liquid mass and adding slaked lime to the filtrate to free it of any excess of sodium carbonate, removing the calcium carbonate formed in the process, then adding a soluble barium compound and boiling the mixture, and finally removing the barium tungstate and treating it with hydrochloric acid, whereby trioxid of tungsten is formed.

In testimony whereof, we have hereunto set our hands at San Francisco, California, this 22nd day of September 1916.

LUDWIG ROSENSTEIN.
ERNEST H. SIMONDS.

In presence of—
JOHN R. OBER,
P. S. PIDWELL.